United States Patent [19]
Gold

[11] Patent Number: 5,481,105
[45] Date of Patent: Jan. 2, 1996

[54] NEUTRON BACKSCATTER GRAVEL PACK LOGGING SONDE WITH AZIMUTHAL SCAN CAPABILITY

[75] Inventor: Randy Gold, Houston, Tex.

[73] Assignee: Halliburton Company, Dallas, Tex.

[21] Appl. No.: 71,170

[22] Filed: Jun. 4, 1993

[51] Int. Cl.$^6$ .................................................. G01V 5/10
[52] U.S. Cl. .................... 250/266; 250/265; 250/269.4
[58] Field of Search .............................. 250/269, 370.1, 250/270, 264, 265, 266

[56] References Cited

U.S. PATENT DOCUMENTS

| | | | |
|---|---|---|---|
| 2,334,262 | 11/1943 | Hare | 250/265 |
| 4,950,892 | 8/1990 | Olesen | 250/269 |
| 5,205,167 | 4/1993 | Gartner et al. | 250/269 |
| 5,252,832 | 10/1993 | Nguyen et al. | 250/269 |

*Primary Examiner*—Carolyn E. Fields
*Attorney, Agent, or Firm*—Arnold White & Durkee

[57] ABSTRACT

An apparatus (sonde) and method of measuring density, or gravel pack quality, in a cased well borehole using a fast neutron source and one or more thermal neutron detectors is described. In one embodiment, a neutron source creates a fast neutron flux which reacts primarily with the material within the borehole casing while a collocated neutron detector counts the number of backscattered thermal neutrons. A novel means of obtaining azimuthal measurement discrimination is provided by a rotating neutron shield. In one instance the shield is quite substantial, creating a narrow measurement window. In another instance, the shield only marginally screens the detector, creating a large measurement window. In an alternative embodiment, a second thermal neutron detector is spaced distally from the neutron source and first detector. This second detector is used to provide a measurement of the borehole's background, or environmental neutron activity, and can be used to improve the quality of the sonde's gravel pack density measurement.

10 Claims, 3 Drawing Sheets

NEUTRON BACKSCATTER GRAVEL PACK LOGGING SONDE WITH AZIMUTHAL SCAN CAPABILITY

BACKGROUND OF THE DISCLOSURE

The present invention is directed to an apparatus and related method for obtaining an azimuthally directed measurement in a cased well borehole and more particularly in one provided with a production tubing surrounded by a gravel pack on the exterior of the production tubing and on the interior of the casing. It is particularly useful for wells into formations which are produced in this fashion, namely, by positioning a casing in the well borehole, cementing the casing in the well and subsequently forming perforations through the casing into the formation so that formation fluid production is obtained. In many wells, one problem is that there will be excessive sand production from a producing formation, and that is often countered by installing a gravel pack in the cased well. A typical arrangement involves a production tubing string centralized within a casing cemented in place with a gravel pack and sand screen supporting the gravel pack on the interior of the casing.

Gravel packing is performed to keep loosely compacted formations from eroding during production. Formation on erosion generally begins at or near the perforation tunnels where fluid flow velocities are highest. When this type of erosion occurs, there are several possible detrimental results such as formation fines which plug the formation and reduce or stop production; they may fill the casing stopping production, and they may be carried by the production stream where they can cause a variety of equipment damage.

The idea behind gravel packing is to fill the perforation tunnel with a permeable material which reduces the flow velocity. It is also desirable that this packing be of a similar pore size to the formation in order to further reduce the movement of formation fines. In the event that the perforation tunnel portion of the gravel pack is not completely successful, the annular portion of the pack inside the casing may act as a barrier to filter the formation material from being carried downstream by the fluid flow.

It is very difficult to measure how well the perforation tunnels are packed. However, much can be learned about the quality of the packing procedure by measurements which detect the uniformity of the annular portion of the pack inside the casing. It is desirable to detect both increases and decreases in gravel pack porosity which may indicate voids and plugging respectively.

Immediately after performing a gravel pack procedure, before flowing the well, voids in the annular area and inside the casing may indicate that the perforation tunnels were not sufficiently packed. It also, belies later problems in that even if the tunnels are well packed, the annular void provides a location for the flowing fluid to carry the pack material from the perforation tunnel into the casing thereby unpacking the tunnel. After a well is produced and there is a partial failure of the packing (some or many tunnels are not packed), the annular portion of the pack acts as a filter to prevent formation fines from moving downstream. Voids detected at this time indicate the reduced capability of this filtering material. This type of failure may also be indicated by the reduced packing porosity, production fluids into the casing at high flow velocities, they will actually erode the gravel pack screen itself if it is not protected by the annular portion of the pack. A work over is necessitated to correct the pack. Work overs interrupt production and cost substantial sums of money to provide service to a well. Even then, when the work over is complete, the pack in the well may sand up again.

In conjunction with gravel pack, a screen typically will be installed, namely a screen formed of screen wire or screen cloth which is inserted in the well borehole to prop up the gravel pack. This defines an annular support for the gravel. This is highly desirable to extend the life of a well.

It is possible to locate a void in the gravel with a tool which is responsive to density. Consider for instance a density measuring device where there is a substantial contrast between the fluid in the pores and the gravel. The fluid may have a density of about 1.0, but perhaps slightly more if it is salt water, and the gravel pack material might have a density of about 2.65 gm/cc. A loss of gravel pack material in a particular region will alter the matrix/fluid ratio and thus reduce the measured bulk density. Conversely, a pack plugging with formation fines will have an increased density. The density is inversely proportional to the detected count rate of a typical gamma ray fluid density tool used in this circumstance and can be employed to indicate gravel pack quality.

That type measurement is made all the more difficult as a result of recent advances which have been introduced for gravel pack materials. The contrast in the density of the matrix and fluid has been reduced with the advent of new packing materials. Regrettably, this makes measuring gravel pack quality more difficult. In other words, as the specific density of the matrix material decreases from a typical density of 2.65 down to 2.0 or perhaps even less, the loss in contrast in the density measurement between the matrix material and the pore fluid makes measurement the gamma density approach difficult, perhaps almost impossible. The present disclosure sets forth a method and apparatus which can be used to measure gravel pack quality that does not depend on a contrast between the fluid and matrix material densities.

BRIEF DESCRIPTION OF THE INVENTION

The present disclosure is directed to a sonde having an external housing which is adapted to be lowered into a well borehole on a logging cable. It is intended to be operated in a centralized position. Moreover, it incorporates a neutron source which is installed at a zero spaced detector to accomplish the measurement. Additionally, a second detector which is located remotely from the first detector can be used. The detectors cooperate with a neutron source capable of forming a neutron flux directed into the formation in the vicinity of the source where the neutrons react with the respective materials and are back scattered toward the detector. This relies on neutron back scatter as opposed to forward scattering and absorption which is involved in porosity measurements. With the source located at the center of the detector, fast neutrons leaving the source are back scattered to the detector only if they undergo large angle scattering to be returned to the detector. At this point the neutrons are generally at low energies, thermal/epithermal can be detected by an appropriate detector. The interaction with the environmental materials primarily involves the neutron back scatter and absorption in contrast with forward scattering and absorption involved in porosity measurements. The present system thus takes advantage of a zero spaced neutron source located at the center of the detector. A flux of fast neutrons from the source thus require the large angle back scattering for return to the area of the tool in the well borehole to interact with the detector. The detected neutron flux is predominately effected by the gravel pack material in the cased well. The constituent materials of the environment on the exterior of the casing are substantially not involved in the reaction yielding the detected back scatter neutrons. The primary reaction of value is the elastic collision with hydrogen nuclei which are found in the fluids in the spaces between the matrix material of the gravel pack. The detected count rate is thus proportional to the hydrogen content or porosity of the environment surrounding the source, and most especially is at such a distance or range from the source that other materials are not involved, thereby excluding neutron interaction with the formations to the exterior. This takes advantage of the fact that a typical thermal neutron diffusion path or length is typically just a few inches, not much more than about five inches, or even less. Thermal neutrons existing at greater distances are ultimately absorbed and not detected. This practically limits the range of investigation. This enables a zero spaced detector to be appropriately sensitive to the hydrogen nuclei in the immediate vicinity and therefore sensitive to and responsive to the pore fluid in the gravel pack matrix. The response is substantially insensitive to other materials beyond that area.

The source to detector spacing controls the effective radial depth. By use of a second detector which is axially aligned in the sonde but at some distance from the zero spaced neutron source in the first detector just mentioned, data can be obtained from the second detector which enables compensation for environmental effects. It provides a base line enabling a measurement which can then be employed with the readings of the zero spaced detector to especially eliminate such effects.

There is an additional factor involved in detection of thermal neutrons. The count rate of the detector is in part determined on the extent of materials which are thermal neutron absorbers. This includes elements such as chlorine or boron. With an unintended substantial increase in such absorbing elements, it is possible to have a false reading indicating gas or a tighter packing of the gravel pack than is actually resident in the area. It is helpful to provide a correction to account for variations in the thermal neutron absorbing elements. In other words, if there is a uniform distribution of absorbing elements, the log can be calibrated to take this fact into account. If however variations arise from variations in absorbing elements, that fact needs to be recognized and removed from the data before determination of the log quality. To accomplish this it may be helpful to incorporate a neutron detector which is sensitive to neutrons having energies above the thermal level. This can be accomplished simply by wrapping the detector element with a cadmium shield which will eliminate thermal neutron flux, thereby providing a detector which is far less sensitive to thermal neutrons and hence far less sensitive to the presence of thermal neutron absorbing elements. That can be used to provide a measurement where the count rate corrects for the variations in absorbing materials. In addition to cadmium, other suitable materials are samarium, carbon, gadolinium and boron. It is one advantage of the present apparatus to incorporate a shield with a detector subject to rotation about the detector to vary the azimuthal neutron flux impingement on the detector. Consider as an example a shield around the detector which encircles the entire detector save and except a lengthwise window of specified width, for example something between 10° and 30°. The shield markedly cuts down the count rate. Assuming that the count rate remains sufficiently high to have some degree of statistical reliability, the shield when rotated provides an azimuthal response indicative of the directional orientation. This enables determination of voids in the gravel pack matrix as a function of direction with respect to the axis of the logging tool. Moreover, the window in the shield permits a response which includes thermal neutrons as well as those of higher energy levels. At the risk of reducing the count rate so low that statistical reliability is not well established, an alternate embodiment is set forth wherein the shield is of specific angular extent and omitted elsewhere. For instance, the shield can have a width of 60° and 300° be omitted; on rotation through one full revolution, the angular location of the 60° shield can be correlated to changes in measured neutron flux accomplished at a much higher count rate; this is desirable to increase the count rate for enhanced statistical reliability.

As a generalization, the method and apparatus of the present gravel pack investigative system involves a determination of gravel pack quality, and is relatively insensitive to eccentering, and is additionally relatively insensitive to material variations on the exterior of the casing. Thus, the data from such a system is primarily related to the nature of the matrix between the screen and the casing, and therefore provides a good indication of quality.

While the foregoing speaks very generally about the present system, and provides something of a summary of the equipment and the method of obtaining such a measure, there is a specific description of the present invention set forth below in specific embodiments which will be detailed. It is appropriate however to summarize very generally the present apparatus as typically including a zero spaced source and detector enabled to form a fast neutron flux which reacts with the materials in the gravel pack and wherein back scatter neutrons are detected by the detector. An azimuthal feature is included derived from a rotated shield where the shield is quite substantial with a narrow window or the reverse of the shield is used. A second detector spaced lengthwise along the supporting sonde is included to make base line measurements. The system relies on back scatter from the materials making up the gravel pack and to that extent, it is responsive to those materials in the immediate vicinity, yielding a shallow depth of investigation which is directed to the region where the gravel pack is located.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
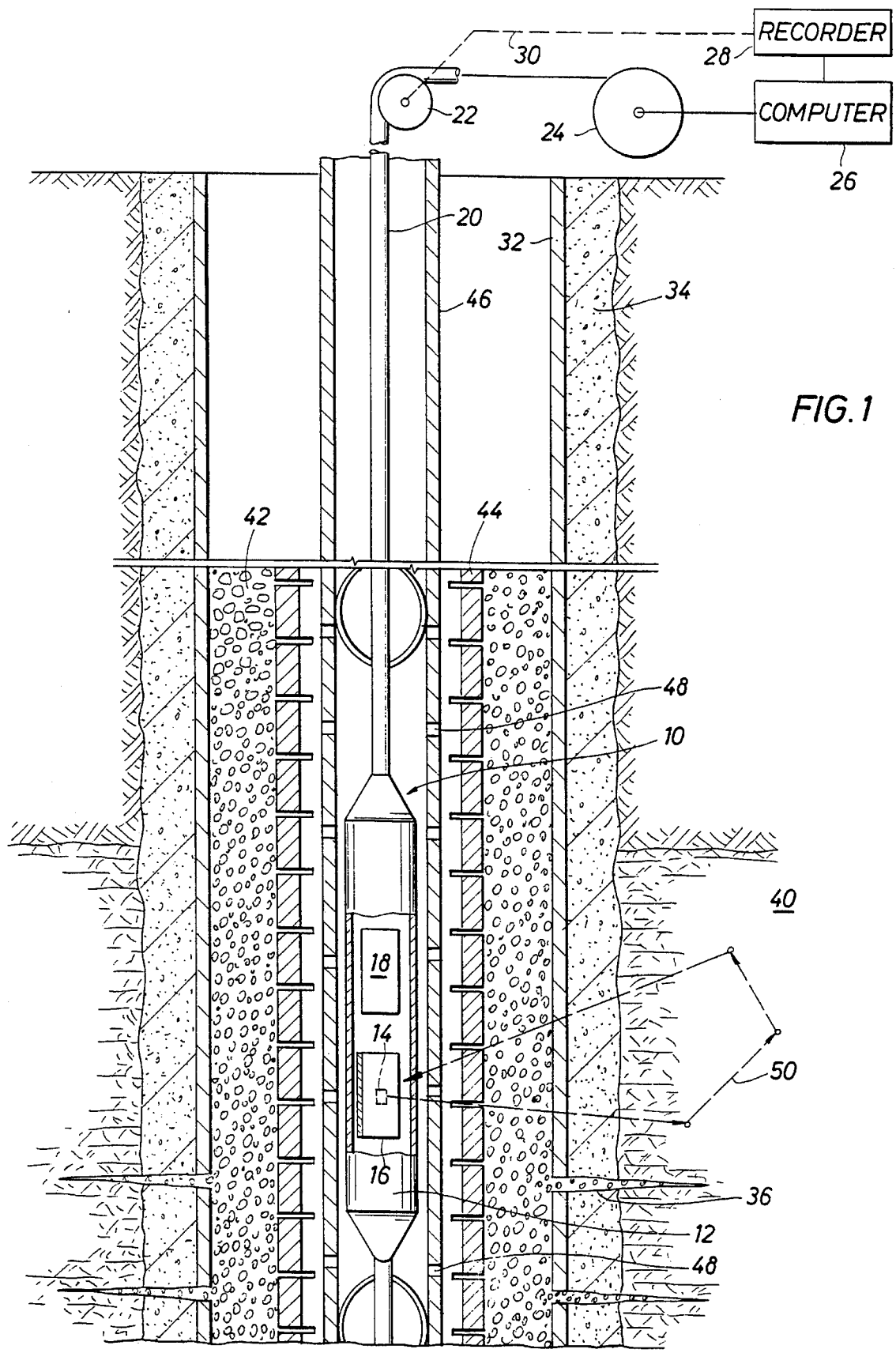
FIG. 1 is a sectional view through the gravel pack logging tool of the present disclosure showing the tools suspended in a production tubing in a well which is provided with a gravel pack and screen located in the cased well borehole.

Attention is now directed to FIG. 1 of the drawings where the numeral 10 identifies a sonde which is constructed in accordance with the teachings of the present disclosure and further wherein the sonde supports a measuring system as described below. Before going to the specifics of that, the location in which the sonde 10 is used should be described in conjunction with the equipment incorporated in FIG. 1 which enables the sonde to be lowered into a well borehole for obtaining measurements indicative of gravel pack quality. This therefore involves a description of the supportive equipment cooperative with the sonde, and also sets forth a detailed description of the cased well and various aspects regarding it.

The sonde incorporates a closed and sealed housing 12 which is provided to operate at elevated temperatures and pressures while protecting the equipment on the interior. The equipment on the interior incorporates a radiation source 14 which will be described in detail. The source may be external (like a band) around the detector without effecting measurement. It is shown located internally of a first detector 16, and is spaced along the length of the tool from a second or far detector 18. The detectors 16 and 18 provide output data in the form of measured counts indicative of the impingement of backscattered neutrons in the region of the detectors 16 and 18. Moreover, the equipment utilizes telemetry circuits to provide the count rates on one or more conductors which are extended through and along a logging cable 20 which supports the sonde 10 in the well. Typically, the sonde is lowered to the bottom of the well and is retrieved by moving upwardly in the well. This enables measurement of the sonde location supported on the logging cable 20. The cable 20 passes over a sheave 22 at the surface and is spooled onto a large storage drum 24. The cable 20 includes one or more signal conductors which provide signals to the surface and these signals are continued from the logging cable to a surface computer 26. Calculations by the computer 26 are output to a recorder 28. The data is recorded as a function of depth. Depth measurement is obtained by an electronic or mechanical depth measuring system 30 which connects with the sheave 22 and provides a depth measurement.

In the well, the numeral 32 identifies the casing which is held in position with the hole in the earth's formations by a layer of cement 34. The completed well is perforated at 36 into a producing formation 40. There are typically many perforations. They produce formation fluid from the formation 40 which flows through the perforations and to the interior of the cased well. As shown, the perforations permit this fluid flow to drain into the cased well borehole typically flowing as a result of a positive formation fluid drive.

There is always the risk that the formation will produce sand along with the fluid mixture, typically, a mixture of oil and water. The sand from the formation will flow through the perforations and tends to plug or choke the well because the sand will typically accumulate adjacent the zone 40 where production is achieved. As the sand is produced, it collects in the cased well above the packer (not shown) which defines the isolated zone. The packer defined zone will normally accumulate the sand until the sand completely clogs the system and prevents proper production of the formation 40.

The well of the present disclosure is provided with an improved production apparatus which includes a gravel pack 42. The gravel pack is formed of gravel like material arranged in an annular space on the exterior of a cylindrical screen 44 which holds the gravel in place. The produced fluid can percolate through the gravel pack, and the sand that is in the produced fluid will tend to settle toward the bottom. The gravel pack therefore serves the desirable purpose of providing a serpentine and multifaceted flow path for the production fluid flow. It is not as vulnerable to silting which might otherwise tend to plug the well. The gravel pack maintains this protection between the perforations into the formations and the screen 44. Generally, the screen is intended to be concentric about the well, centered between the casing 32 and the production tubing 46 which is arranged in the well. In similar fashion, the sonde 10 is centralized in the tubing 46 by centralizers on the sonde 10 the centrilizers being omitted for sake of clarity.

Ordinarily, production flows from the perforations 36 and into the gravel pack 42. The production flow continues radially inwardly above the bottom packer (not shown) which defines this production zone 40. The production of fluid from the perforations 36 through the gravel pack 42 and then through the screen 44 continues through the production tubing 46 perforated at 48.

After a well has been operated for an interval, there may be the risk of settling or other types of segregation in the gravel which makes up the gravel pack. It is therefore helpful to periodically test the well for integrity of the packing material in the well. A loss of integrity is typically evidenced by a large void or plugging in the gravel pack. The present apparatus is a system which is intended to accomplish this.

As shown in FIG. 1 of the drawings, the numeral 14 identifies a source of neutrons. These are relatively fast neutrons, sufficiently fast that they are not detected by the detector 16 because they have energy levels which are excessive for detection thereby. The detector 16 more aptly responds to thermal neutrons. The numeral 50 represents a typical backscattering pathway whereby a neutron is emitted from the source 14 and is deflected along its pathway and returned by means of backscatter reactions toward the detector 16. The detector 16 is at zero spacing from the neutron source 14. By that, it is meant that both are located at a common location. The common location is occasioned by positioning the neutron source at the center of the detector. The detector is not responsive to extremely fast neutrons which are emitted from the source. Thus, in that sense, the detector is transparent to high energy neutrons. It is not transparent however to thermal neutrons which are returned in the backscattering approach chosen for the present disclosure. This system is different from other types of systems which typically utilize a forward scattering approach.

The hypothetical neutron path 50 has been exaggerated in length to provide a representative example of this backscattering. As a practical matter, the neutrons which are emitted from a source are provided with energy levels great enough that the neutrons penetrate beyond the casing 32 into the adjacent formations. However, neutrons thermalized at this distance will not have sufficient energy to return to the detector. There is a limited range at which backscattering can occur. In part, that depends on the type of materials that are in the immediate area and also depends on the type of interaction that occurs between the backscattered neutrons and the matrix of materials which are irradiated by the neutron emissions. For this reason, it is desirable to position an independent neutron measuring device which is able to provide readings of thermal energy neutrons which are returned from the immediate vicinity. As a generalization, the backscatter range of neutrons emitted by the present apparatus is only three to five inches. At ranges beyond that, it is rather improbable that the neutrons will be backscattered and measured. As a practical matter, this means that the responsive area is within the casing, and it generally does not involve the regions external to the casing. In other words, the steel which makes up the casing, the cement which lines the well borehole and the materials which make up the earth's formations adjacent to the well are generally not involved in the backscatter reaction. The neutron source 14 (a source of fast neutrons) might be Cf-252 or alternately AmBe-241. The curves of FIG. 4 show porosity responses for the latter type source while the curves in FIG. 5 show responses for the former neutron source. To the extent that such a source can be adapted and used, it is normally located at a finite point, being structurally relatively small so that it can be located as shown in FIG. 1 of the drawings. An alternate source is an encircling ring or band of appropriate material. The detector is typically an He-3 detector system.

In FIG. 1 of the drawings, both the detectors 16 and 18 are formed of the same type detector systems, preferably being He-3 detectors, and they typically have approximately equal size. If anything, the detector 18 can be made larger so that it provides an increased count rate as a result of the increase in size. This will tend to increase the count rate to over come the reduction in count rate which results from the greater linear spacing between the source 14 and the detector 18.

Noting that the backscatter range provides a depth of investigation of only 3 to perhaps 5 inches, the system of the present disclosure is able to irradiate the gravel packing materials quite readily without obtaining data from the region beyond the casing. This reduces the difficulties in elimination of environmental effects. These effects are even further reduced by obtaining a recording as a function of depth of the detector 18. Because of the greater spacing between that detector and the source, the primary purpose of the detector 18 is to provide a measurement which can be used to correct the small environmental effects in data from the detector 16.

Going now to other views in the drawings, the numeral 60 identifies a modified collimation source or system. The system shown in FIG. 2, the numeral 52 identifies the neutron source which is located within the detector 54. Again, the detector can be a typical He-3 detector which is isolated in that region. There is a suitable gap 56 which enables the emitted neutron flux to flow out through a steel shell 58 which defines the structure of the sonde. There are upper and lower shielding at 62 and 64 which is preferably formed of $B_4C$ which serves as a collimator to direct the neutron flux out to the gap or window at 56. This system provides a radially outwardly directed neutron flux.

Figure 2:
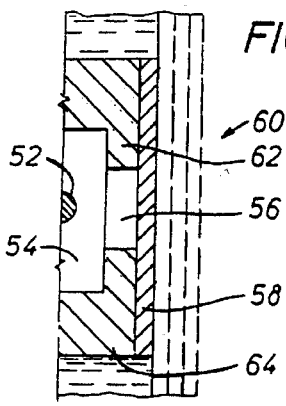
FIG. 2 is a sectional view through a tool detector system in accordance with the present disclosure.
Figure 6:
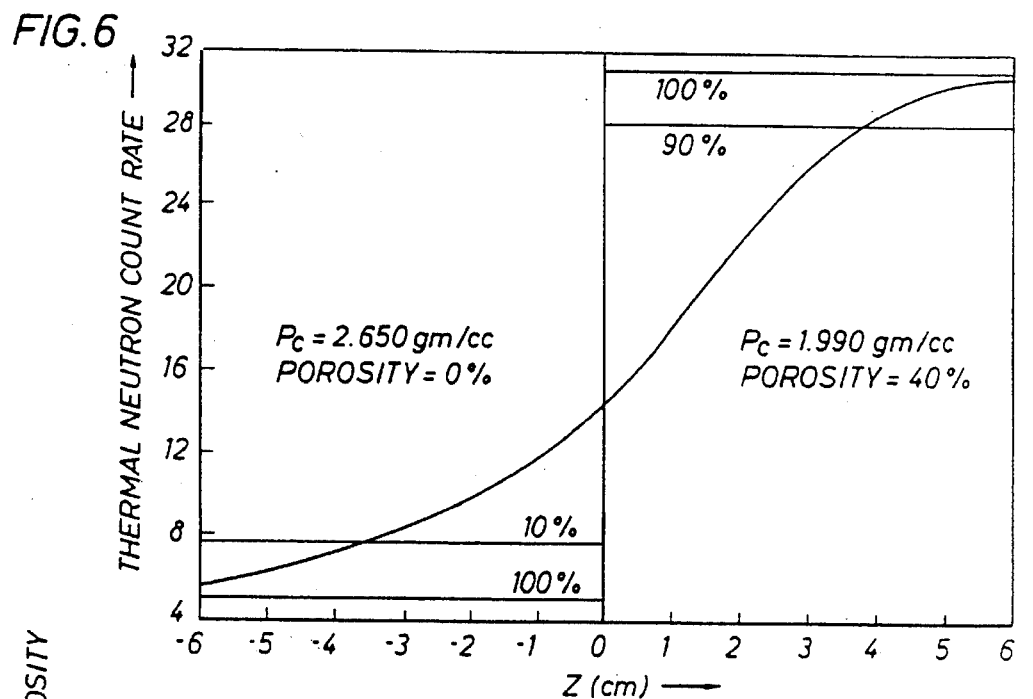
FIG. 6 is a graph showing the count rate as a function of a step change in density/porosity along the axis of the well borehole.

Using FIG. 2 as a representative irradiation source which provides a flux radially outwardly into the gravel pack region, FIG. 6 shows the vertical response of such a source as that shown in FIG. 2. This shows that a 10% to 90% detector response is achieved in 8 cm. for a step porosity charge of 0% to 40% (i.e. 2.65 gm/cc to 1.99 gm/cc for a matrix with density 2.65 gm/cc and fluid of 1.0 gm/cc) along the borehole. Should the gravel pack be located further, from the sonde, the curve would tend to be flattened and less sharply defined. Should there be no vertical collimator, the curve likewise would have reduced vertical resolution. In summary, FIG. 6 shows certain aspects of the vertical response and resolutions which might be achieved in the context of this type or extent of vertical collimation.

Figure 3A:
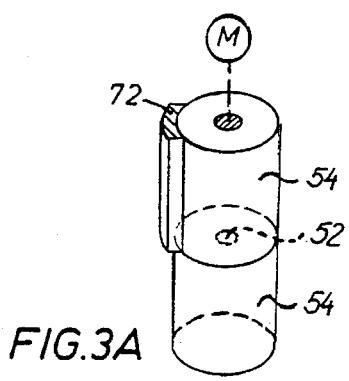
FIG. 3A is a sectional view through a detector showing a zero spaced radiation source on the interior in conjunction with a detector and segment of a shield thereabout.
Figure 3B:
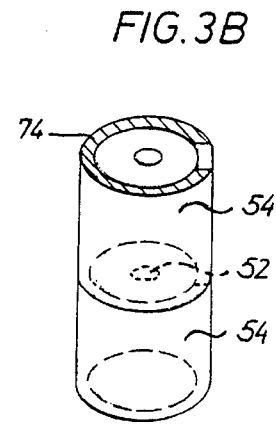
FIG. 3B is a view similar to FIG. 3A showing the same detector with similar shield material wherein FIG. 3B differs in that the shield fully extends around the detector and has a small window.

Typical thermal neutron detectors, such as He-3 proportional counters, are sensitive to detecting both thermal and epithermal neutrons. The relative sensitivity to one or the other is determined by gas pressure and shielding. To detect primarily epithermal neutrons, gas pressure is increased thereby raising epithermal neutron detection efficiency and the detector is also surrounded by a primarily thermal neutrons, lower gas pressures are used to reduce the portion may still be counted. FIGS. 3A and 3B illustrate detector systems for performing azimuthally sensitive thermal neutron detection employing a difference in technique for removing the epithermal neutron contribution.

FIGS. 3A and 3B show detector systems which each include two stacked cylindrical detectors 54 and a neutron source located at the interface of these detectors. The source 52 may be positioned at the axis of the detectors or as a band or ring around the perimeter of the detectors at the same interdetector interface. A single position sensitive detector can be used. In both instances, it is preferable to utilize a motor which rotates the surrounding shield through 360° of rotation with respect to a vertical axis coincident with the tool axis and the detectors. A motor M is included for this purpose. It is connected to rotate the shield. As a practical matter, the shield can be affixed to the detector and the two can be rotated together by the motor. Radiation from the fast neutron source is normally omnidirectional so that it has no directional preference. Likewise an unshielded detector or one with a uniform shield does not have a directional preference. They respond in all directions. A directional preference defined by a window is incorporated by placing shielding material such as cadmium of the requisite thickness on the detector. Comparing the two views, the construction in FIG. 3A enables the detector to receive a higher count rate because the amount of shielding is reduced. Since the shielding is reduced, the count rate is higher but the angular discrimination is reduced. By rotating the shield 72 for a full revolution at a fixed elevation, it is possible to obtain azimuthal discrimination for the detector. By contrast, the construction shown in FIG. 3B provides a reduced count rate but sharper azimuthal discrimination. The shield fully encircles the detector except for the small window.

The shields can have an angular extent which can be varied. To have a modest reduction in the direction of azimuth of interest, the shield 72 is preferably in the range of perhaps 15° to 45° in arc. In one embodiment, the detector may be shielded with a shield of up to about 75° azimuthal angle. The window in the shield 74 can be of that size. As will be understood, in both instances azimuthal resolution is impacted by the shield and window angular size. The advantages of the embodiment in FIG. 3A are therefore an increased count rate but at the cost of reduced recognition of adjacent voids in the gravel pack material while the embodiment in FIG. 3B provides enhanced resolution but at the cost of operating at a reduced count rate. The latter is desirable to the extent that sharp definition is obtained so long as the count rate is sufficiently high to have statistical reliability.

In operation, the rotated shield window mechanism shown in Figs. 3A and 3B enables resolution of a nearby void in the gravel pack material. This is accomplished even in face of reduced density contrast between the packing material and the fluid which fills the gravel pack region. Thus, there is less contrast in the advent of gravel pack materials having a density of perhaps 1.8 as opposed to 2.65 gm/cc which had prevailed in years past. Consider as one example, a 40% porosity fresh water sand associated with a desirable or proper gravel pack in the cased well; neutrons emitted from the fast neutron source are thermalized in the gravel pack region and are backscattered to the detector. This provides a response for one cycle of rotation of the shielding around the detector (it being recalled that the detector functions in an omnidirectional fashion except where shielding makes some impact; either the shield can be rotated or both the shield and the detector can be rotated). Simultaneously, a reading is taken from the detector 18. The latter provides a curve, with appropriate sizing, of the background and permits the background reading to be deducted from the reading of the rotated detector system thereby enabling removal of background variations during the interval of recording the data during one revolution.

In FIGS. 3A and 3B, it is desirable to position two similar detectors serially where the first detector in FIG. 3A has the partial shield and the second has no shield. Likewise, FIG. 3B shows a first detector which is a substantially shielded with a window and the second detector has a complete shield.

Approximations of the count rates observed in the two detector schemes shown in FIGS. 3A and 3B are a function of the surface area of the detector and the neutron flux per unit surface area per unit of time. The following six equations thus describe the situation with the shield and detector arrangement shown in FIG. 3A and 3B: using the notations $C_1$ and $C_2$ to describe generally the count rate at the two adjacent detectors.

$$C_1 = A(\phi_t + \phi) \tag{1a}$$

$$C_1 = A\phi \tag{1b}$$

$$C_2 = (A - A_s)(\phi_t + \phi) + A_s(\phi) \tag{2a}$$

$$C'_2 = A_s\phi + (A - A_s)(\phi_t + \phi) \tag{2b}$$

$$C_{16} = C_1 - C_2 = A_s\phi_t \tag{3a}$$

$$C'_{16} = C'_2 - C'_1 = (A - A_s)\phi_t \tag{3b}$$

In the foregoing, $C_{16}$ and $C'_{16}$ the count rate in the detector 16 of FIG. 1 provided with the shield system shown in FIG. 3A or 3B respectively. The symbol $A_s$ is the surface area of the shield and the A represents the surface area of the detector. The symbols $\Phi_t$ and $\Phi$ represent the thermal and the above thermal energy neutron flux backscattered to the surface of the detectors. The count rate, $C_{16}$ is the thermal flux in the direction of the shield strip. The count rate $C'_{16}$ is the thermal flux entering through the inshielded window. These differences in measurements enable the thermal counts to be separated from the epithermal. This is normally a problem because many neutron detectors, such as He-3, are sensitive to neutrons of both energies.

Figure 4A:
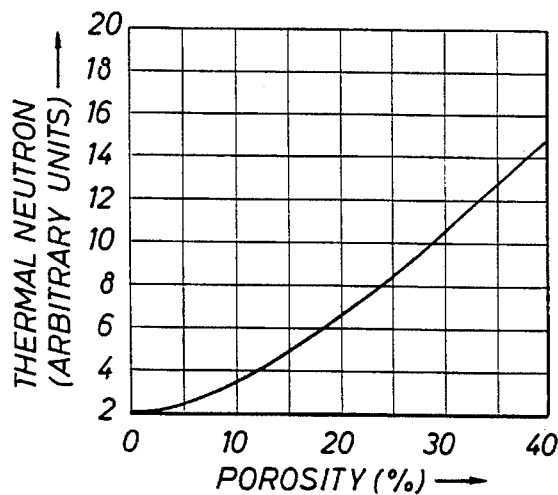
FIGS. 4A and 4B show a graph of the count rate versus porosity. See corrected FIGS.
Figure 4B:
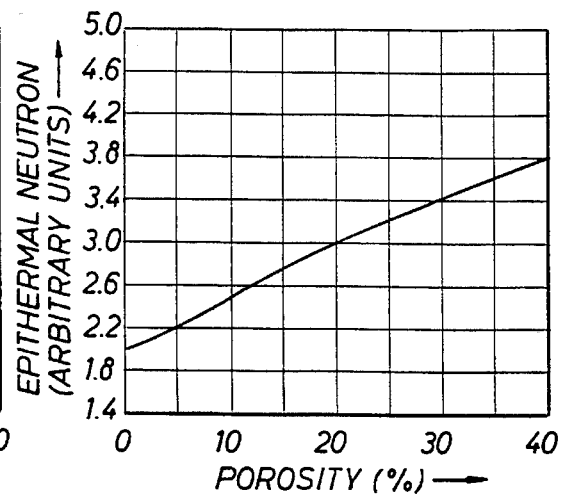
Figure 5A:
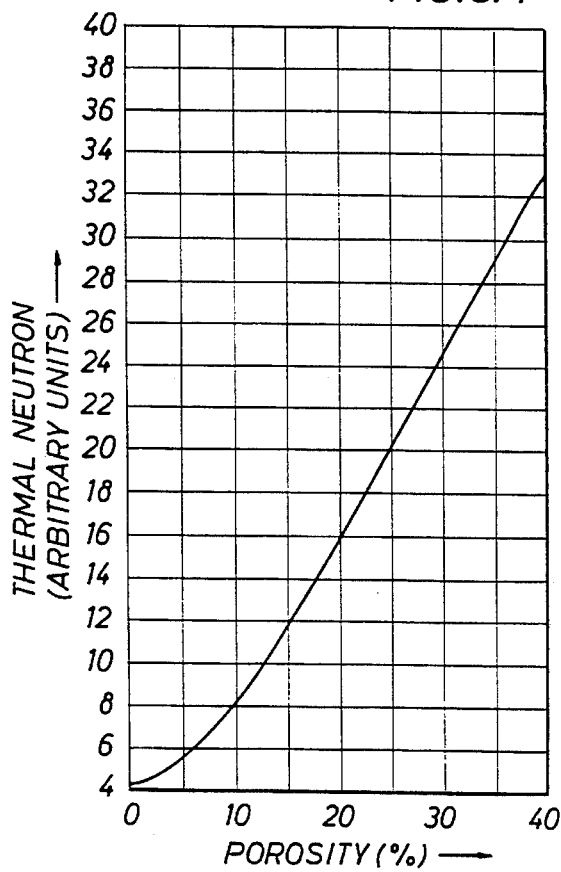
FIGS. 5A and 5B are graphs similar to FIGS. 4A and 4B.
Figure 5B:
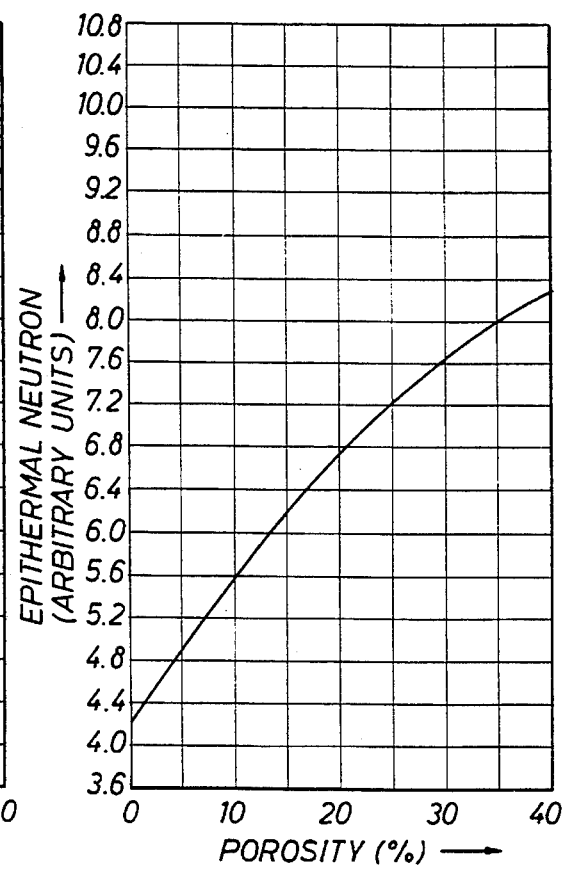

The contrast between FIGS. 4 and 5 show the difference in the relative detected count rate from AmBe-241 and Cf-252 respectively. Otherwise, FIGS. 4 and 5 are identical except for this change. The contrast between FIG. 4A compared with FIG. 4B (and also comparing FIG. 5A to 5B) shows the contrast in response for thermal and epithermal detectors. The data indicates relatively good sensitivity to porosity. The data shown in FIGS. 4 and 5 thus shows that the gravel pack material provides the necessary response and that variations in porosity can then be used to locate voids in the gravel pack material.

Figure 7:
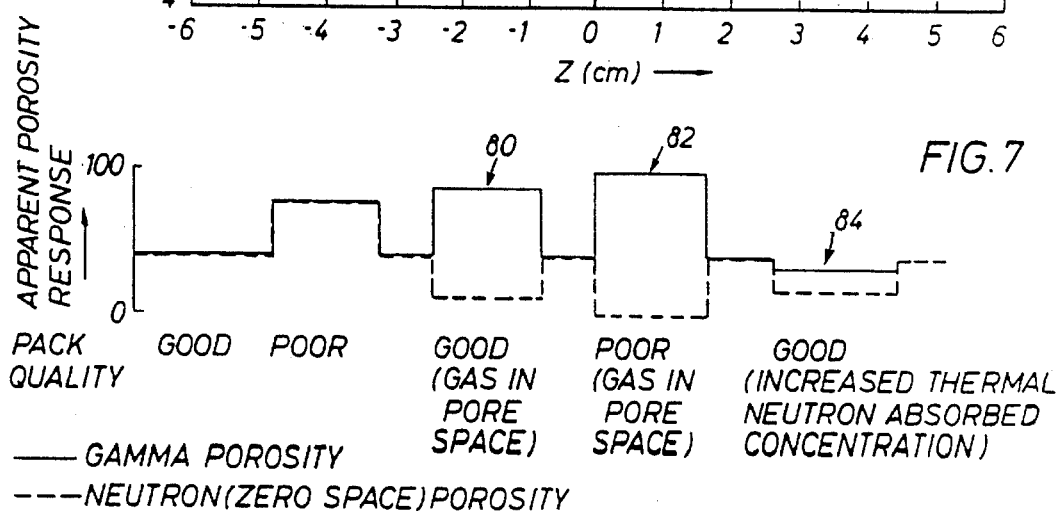
FIG. 7 shows porosity apparent readings of a gamma porosity and a neutron porosity measurement so that the two curves aid in identifying the condition of a gravel pack in a well borehole.

FIG. 7 of the drawings shows measurements of porosity in the ordinant with variations in gamma porosity and neutron (zero spaced porosity). The notations across FIG. 7 show a good gravel pack, and then a poor gravel pack. In the presence of natural gas, the curve of FIG. 7 at 80 shows a good gravel pack while a poor gravel pack is shown at 82. Note the difference in the readings. Finally, the curve at 84 shows another good gravel pack indication.

The separation of the apparent porosity responses using these measurements enables pack quality to be determined even in the presence of natural gas or high-thermal neutron absorber concentrations.

While the foregoing is directed to the preferred embodiment, the scope thereof is determined by the claims which follow:

I claim:

1. A method for making azimuthally sensitive measurements of a gravel pack along a cased well borehole comprising the steps of:

in a cased well borehole having a gravel pack therein on the exterior of a tubing string, positioning a sonde supporting a source of neutron radiation and a first detector for detecting neutron radiation from the gravel pack region around the tubing string for producing an output signal indicative of the neutron radiation detected by said first detector, wherein said first detector is partially shielded in azimuth, and is rotated so that detected radiation is azimuthally measured;

providing neutron irradiation from the neutron source to interact with the gravel pack material around the tubing string to produce neutron radiation to enable detection of the neutron radiation with said first neutron radiation detector; and altering the azimuthal direction of sensitivity of said first neutron radiation detector to sweep a desired azimuthal area with respect to said first detector.

2. The method of claim 1 wherein said sonde comprises a second neutron radiation detector for detecting neutron radiation from said gravel pack region around said tubing string, where said first detector is shielded in azimuth for rotational measurement and said second detector is azimuthally uniform in detection.

3. The method of claim 2 including the step of shielding the second detector from thermal neutron flux.

4. The method of claim 3, wherein said first detector's shield has an azimuthal window with an angle of up to about 45°.

5. The method of claim 2 including the step of shielding said first detector fully therearound with an azimuthal window.

6. The method of claim 2 including the step of relatively rotating the first detector's shield with respect to a tool axis extending along the cased well borehole.

7. The method of claim 6 including the step of rotating the first and second detectors.

8. The method of claim 1 including the step of forming radiation from said source and measuring the first detector's response as a function of well depth.

9. A method of making azimuthally sensitive measurements of a gravel pack; along a cased well borehole, comprising the steps of:

in a cased well borehole having a gravel pack therein on the exterior of a tubing string, positioning a sonde supporting a source of neutron radiation and first and second detectors for detecting neutron radiation from the gravel pack region around the tubing string for producing an output signal indicative of the neutron radiation detected by said first and second detectors, where said first detector is shielded in azimuth for rotational measurement and said second detector is azimuthally uniform in detection, with said first detector shielded with a shield of up to about 75° azimuthal angle;

providing neutron irradiation from the neutron source to interact with the gravel pack material around the tubing string to produce neutron radiation to enable detection of the neutron radiation with said first neutron radiation detector; and altering the azimuthal direction of sensitivity of said first neutron radiation detector to sweep a desired azimuthal area with respect to said first detector.

10. The method of claim 9 including the step of shielding the second detector from thermal neutron flux with a uniform shield therearound.

* * * * *